(12) United States Patent
Goesnar et al.

(10) Patent No.: US 9,159,328 B1
(45) Date of Patent: Oct. 13, 2015

(54) AUDIO FINGERPRINTING FOR ADVERTISEMENT DETECTION

(71) Applicant: Verizon Patent and Licensing Inc., Basking Ridge, NJ (US)

(72) Inventors: Erwin Goesnar, Daly City, CA (US); Ravi Kalluri, San Jose, CA (US)

(73) Assignee: VERIZON PATENT AND LICENSING INC., Basking Ridge, NJ (US)

(*) Notice: Subject to any disclaimer, the term of this patent is extended or adjusted under 35 U.S.C. 154(b) by 41 days.

(21) Appl. No.: 14/227,659

(22) Filed: Mar. 27, 2014

(51) Int. Cl.
*G10L 19/018* (2013.01)
*G06Q 30/02* (2012.01)

(52) U.S. Cl.
CPC .......... *G10L 19/018* (2013.01); *G06Q 30/0241* (2013.01)

(58) Field of Classification Search
USPC .................................................. 704/500–504
See application file for complete search history.

(56) References Cited

U.S. PATENT DOCUMENTS

| | | | |
|---|---|---|---|
| 2008/0263359 A1* | 10/2008 | Radzishevsky | 713/176 |
| 2010/0057231 A1* | 3/2010 | Slater et al. | 700/94 |
| 2014/0142958 A1* | 5/2014 | Sharma et al. | 704/500 |

OTHER PUBLICATIONS

Wikipedia, "Acoustic fingerprint", http://en.wikipedia.org/wiki/Acoustic_fingerprint, Feb. 21, 2014, 4 pages.
Avery Li-Chun Wang, "An Industrial-Strength Audio Search Algorithm" Shazam Entertainment, Ltd., Proceedings of the 4th International Conference on Music Information Retrieval, 2003, 7 pages.

* cited by examiner

*Primary Examiner* — Abul Azad

(57) ABSTRACT

A device may receive an audio sample, and may separate the audio sample into multiple sub-band signals in multiple frequency bands. The device may modify an upper boundary and a lower boundary of at least one of the frequency bands to form modified frequency bands. The device may modify the sub-band signals to form banded signals associated with the modified frequency bands. The device may smooth the banded signals to form smoothed signal values. The device may identify peak values included in the smoothed signal values, and may generate an audio fingerprint for the audio sample based on the smoothed signal values and the peak values.

20 Claims, 9 Drawing Sheets

AUDIO FINGERPRINTING FOR ADVERTISEMENT DETECTION

BACKGROUND

An audio fingerprint may refer to a condensed digital summary, generated from an audio sample, that can be used to identify the audio sample or locate similar items in an audio fingerprint database. For example, audio fingerprinting may be used to identify songs, melodies, tunes, etc.

DETAILED DESCRIPTION OF PREFERRED EMBODIMENTS

The following detailed description of example implementations refers to the accompanying drawings. The same reference numbers in different drawings may identify the same or similar elements.

When providing an audio and/or video stream, a service provider may want to identify a segment of the stream based on contents included in the stream. For example, when providing a streaming television service, the service provider may want to identify a particular advertisement so that a substitute advertisement can be provided in place of the particular advertisement, or so that a viewer can be prevented from skipping an advertisement that an advertiser has paid to include in the stream. Such identification can be performed using an audio fingerprint. However, many audio fingerprinting techniques are slow and resource intensive (e.g., requiring a large amount of processing power, storage capacity, etc.), and may not be suitable for identifying an advertisement or another segment of a stream while the stream is being provided (e.g., for display to a viewer). Implementations described herein provide a fast, less resource intensive way to identify audio streams using a compact audio fingerprint.

Figure 1:
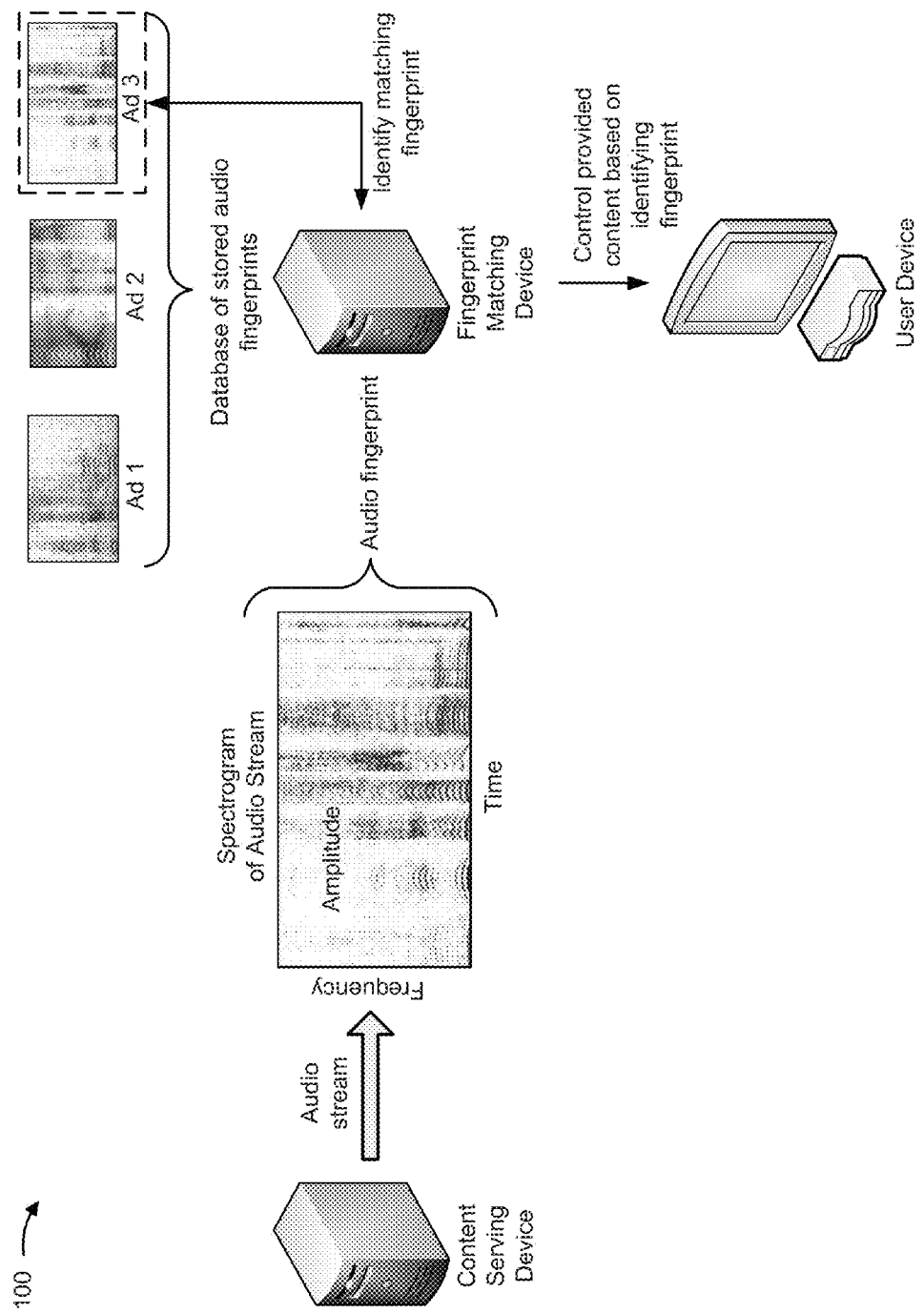
FIG. 1 is a diagram of an overview of an example implementation described herein.

FIG. 1 is a diagram of an overview of an example implementation 100 described herein. As shown in FIG. 1, a content serving device may provide an audio stream (e.g., as part of an audio/video stream) to a fingerprint matching device, which may process the audio stream prior to providing the audio stream to a user device, such as a set-top box capable of providing content for display on a television. As shown, the fingerprint matching device may use a spectrogram of the audio stream (e.g., a graph that indicates frequency and amplitude of the audio steam over time) to generate an audio fingerprint for the audio stream.

As further shown in FIG. 1, the fingerprint matching device may also apply the audio fingerprinting technique to different audio samples, such as advertisements, and may store the resulting audio fingerprints in a database. The fingerprint matching device may search the database of audio fingerprints to identify an audio fingerprint that matches the audio fingerprint generated based on the audio stream. The fingerprint matching device may determine characteristics of the matching audio fingerprint (e.g., whether the audio stream relates to an advertisement, whether the audio stream may be skipped or fast-forwarded, whether to replace the audio stream with another audio stream, etc.). Based on the characteristics, the fingerprint matching device may control content provided to a user device, such as by controlling whether an advertisement may be skipped or fast-forwarded, replaced, or the like.

The audio fingerprints for the audio stream and/or the audio samples may be generated using an audio fingerprinting technique described in more detail elsewhere herein. The audio fingerprinting technique may be used to quickly generate an audio fingerprint, so that an audio stream can be quickly identified before being provided to the user device. Furthermore, the audio fingerprinting technique may reduce a quantity of data points used to generate an audio fingerprint, thereby reducing an amount of storage space required to store the audio fingerprints. In this way, the fingerprint matching device may quickly and efficiently identify audio streams and/or segments of audio streams (e.g., audio samples).

Figure 2:
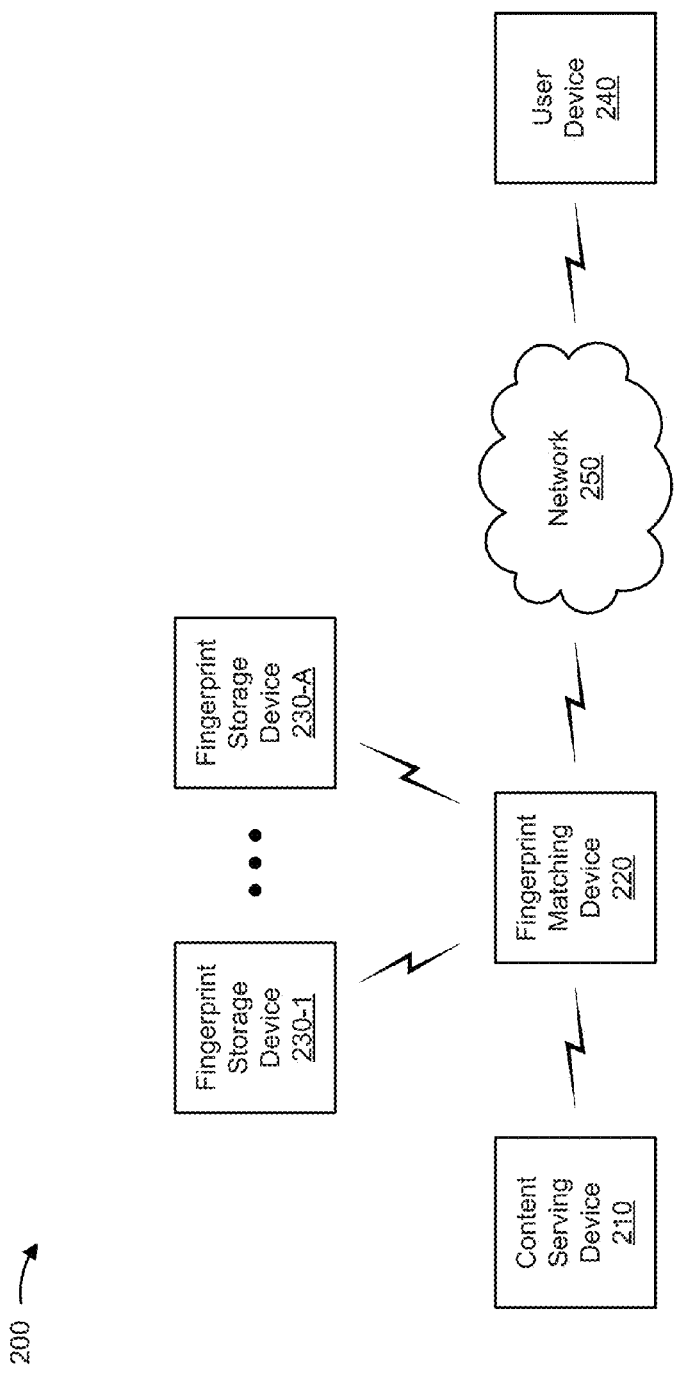
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a content serving device 210, a fingerprint matching device 220, one or more fingerprint storage devices 230-1 through 230-A (A≥1) (hereinafter referred to collectively as "fingerprint storage devices 230," and individually as "fingerprint storage device 230"), a user device 240, and a network 250. Devices of environment 200 may interconnect via wired connections, wireless connections, or a combination of wired and wireless connections.

Content serving device 210 may include one or more devices capable of receiving, generating, storing, processing, and/or providing a content stream, such as an audio stream, a video stream, an audio/video stream, etc. For example, content serving device 210 may include a storage device, a server (e.g., a content server, a host server, a web server, an HTTP server, etc.), or a similar device. Content serving device 210 may receive requests for one or more content streams (e.g., from fingerprint matching device 220 and/or user device 240), and may provide the requested content stream(s).

Fingerprint matching device 220 may include one or more devices capable of generating audio fingerprints based on an audio stream and/or an audio sample. For example, fingerprint matching device 220 may include a server (e.g., an application server, a content server, etc.), a traffic transfer device, or the like. In some implementations, fingerprint matching device 220 may receive an audio stream from content serving device 210, may generate an audio fingerprint for the audio stream, and may search for a matching audio fingerprint (e.g., using fingerprint storage device(s) 230) so that the audio stream may be identified. Fingerprint matching device 220 may identify characteristics associated with the matching audio fingerprint, and may control content provided to user device 240 based on the characteristics.

Fingerprint storage device 230 may include one or more devices capable of storing audio fingerprints and/or information associated with audio fingerprints (e.g., an audio identifier, information that identifies one or more characteristics associated with an audio fingerprint, etc.). For example, fingerprint storage device 230 may include a server (e.g., a storage server), a database, a storage device, or the like. Fingerprint matching device 220 may access one or more fingerprint storage devices 230 to identify matching audio fingerprints.

User device 240 may include one or more devices capable of receiving content and providing the received content (e.g., via a display, a speaker, etc.). For example, user device 240 may include a set-top box, a desktop computer, a laptop computer, a tablet, a smart phone, a television, a radio, a gaming system, or the like. In some implementations, user device 240 may receive content and/or instructions for providing the content from fingerprint matching device 220, and may provide the content (e.g., based on the instructions).

Network 250 may include one or more wired and/or wireless networks. For example, network 250 may include a cellular network (e.g., an LTE network, a 3G network, a code division multiple access (CDMA) network, etc.), a public land mobile network (PLMN), a wireless local area network (e.g., a Wi-Fi network), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, and/or a combination of these or other types of networks.

The number and arrangement of devices and networks shown in FIG. 2 is provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
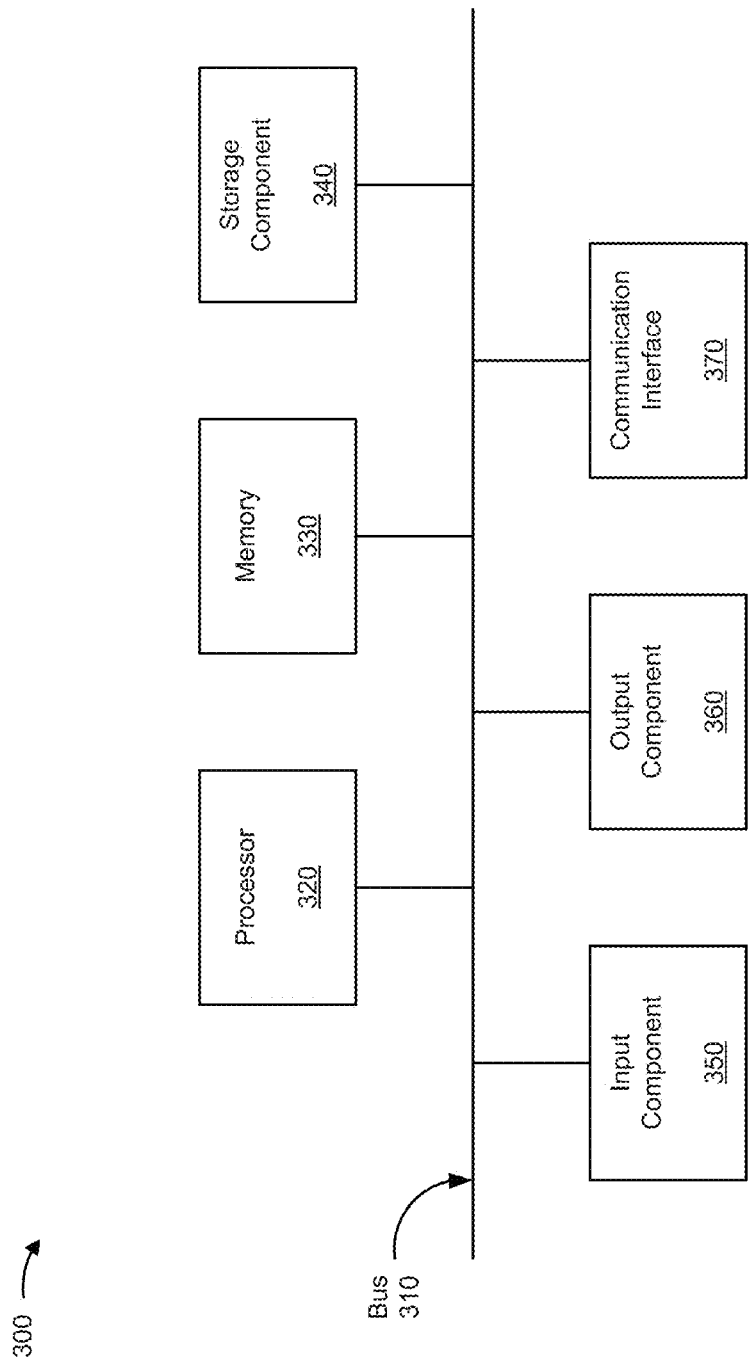
FIG. 3 is a diagram of example components of one or more devices of FIG. 2.

FIG. 3 is a diagram of example components of a device 300. Device 300 may correspond to content serving device 210, fingerprint matching device 220, fingerprint storage device 230, and/or user device 240. In some implementations, content serving device 210, fingerprint matching device 220, fingerprint storage device 230, and/or user device 240 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 may include a component that permits communication among the components of device 300. Processor 320 may include a processor (e.g., a central processing unit (CPU), a graphics processing unit (GPU), an accelerated processing unit (APU), etc.), a microprocessor, and/or any processing component (e.g., a field-programmable gate array (FPGA), an application-specific integrated circuit (ASIC), etc.) that interprets and/or executes instructions. Memory 330 may include a random access memory (RAM), a read only memory (ROM), and/or another type of dynamic or static storage device (e.g., a flash memory, a magnetic memory, an optical memory, etc.) that stores information and/or instructions for use by processor 320.

Storage component 340 may store information and/or software related to the operation and use of device 300. For example, storage component 340 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive.

Input component 350 may include a component that permits device 300 to receive information, such as via user input (e.g., a touch screen display, a keyboard, a keypad, a mouse, a button, a switch, a microphone, etc.). Additionally, or alternatively, input component 350 may include a sensor for sensing information (e.g., a global positioning system (GPS) component, an accelerometer, a gyroscope, an actuator, etc.). Output component 360 may include a component that provides output information from device 300 (e.g., a display, a speaker, one or more light-emitting diodes (LEDs), etc.).

Communication interface 370 may include a transceiver-like component (e.g., a transceiver, a separate receiver and transmitter, etc.) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 is provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
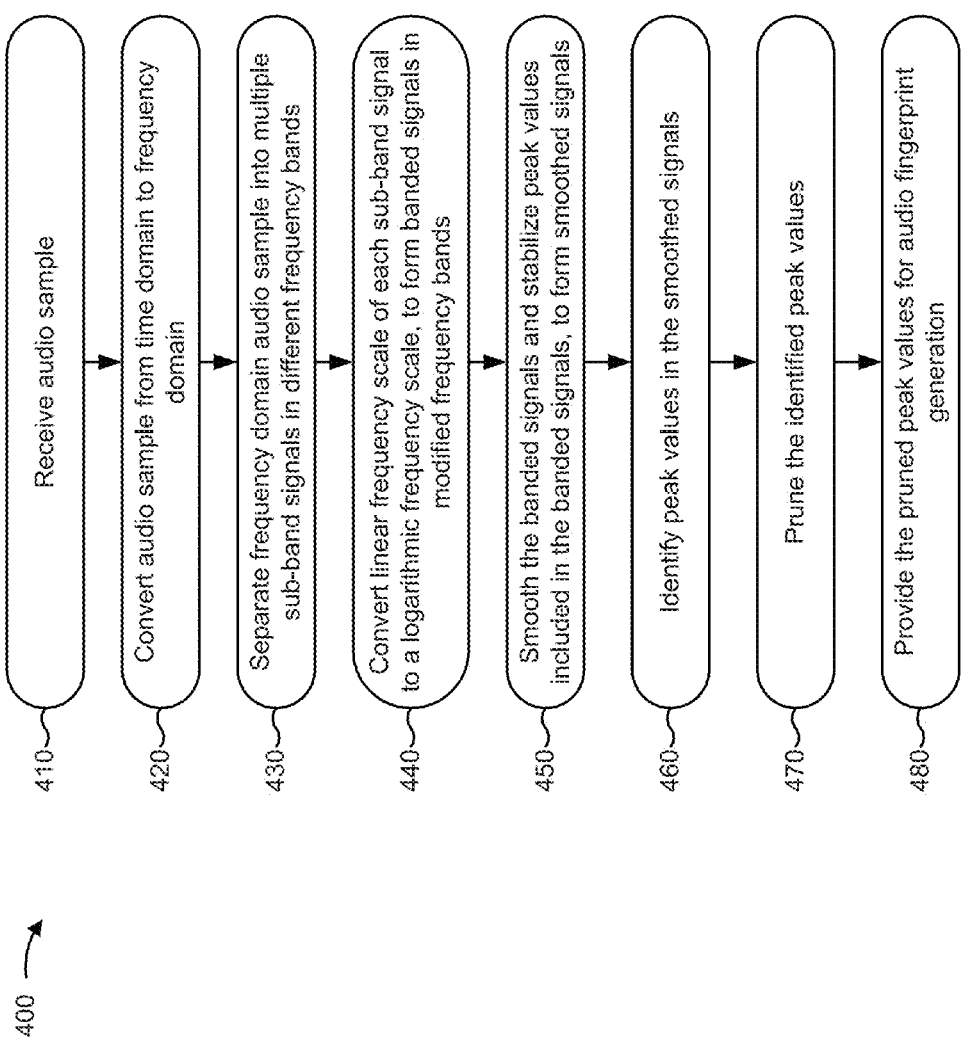
FIG. 4 is a flow chart of an example process for processing an audio sample for audio fingerprint generation.

FIG. 4 is a flow chart of an example process 400 for processing an audio sample for audio fingerprint generation. In some implementations, one or more process blocks of FIG. 4 may be performed by fingerprint matching device 220. In some implementations, one or more process blocks of FIG. 4 may be performed by another device or a group of devices separate from or including fingerprint matching device 220, such as content serving device 210, fingerprint storage device 230, and/or user device 240.

As shown in FIG. 4, process 400 may include receiving an audio sample (block 410), converting the audio sample from a time domain to a frequency domain (block 420), and separating the frequency domain audio sample into multiple sub-band signals in different frequency bands (block 430). For example, fingerprint matching device 220 may receive an audio sample from content serving device 210. Additionally, or alternatively, fingerprint matching device 220 may receive the audio sample from another device, and/or may receive an audio identifier for the audio sample (e.g., when creating a database of audio samples to be used to identify audio streams).

The audio sample may be received in the time domain, and fingerprint matching device 220 may convert the time domain audio sample to a frequency domain audio sample (e.g., using a Fast Fourier Transform). The frequency domain audio sample may be represented as S[n], where n represents a time index and/or a sample number (e.g., n=0, 1, 2, ..., ∞).

Fingerprint matching device 220 may separate the audio sample into multiple sub-band signals in different frequency bands (e.g., having different frequencies, or falling within different frequency ranges). For example, fingerprint matching device 220 may use a filter bank (e.g., one or more band-pass filters) to separate an input audio signal into multiple audio signals that each carry a particular frequency sub-band of the input audio signal. A particular sub-band signal may be represented as $S_{bin}[f,n]$, where f represents a sub-band index. Fingerprint matching device 220 may separate the frequency domain audio sample into F sub-bands, such that f=1, 2, ..., F. The value of F may be configurable, in some implementations. Additionally, or alternatively, the sub-bands may span a linear frequency scale.

As further shown in FIG. 4, process 400 may include converting a linear frequency scale of each sub-band signal to a logarithmic frequency scale, to form banded signals in modified frequency bands (block 440). For example, fingerprint matching device 220 may transform a sub-band signal from a linear frequency scale to a logarithmic frequency scale. In some implementations, fingerprint matching device 220 may apply banding to a sub-band signal so that the bandwidth of a sub-band increases logarithmically as the frequency (or frequencies), associated with the sub-band, increases. The resulting banded signals may include a compact representation of a frequency portion of the sub-band signal. A banded signal may be represented as $S_{band}[k,n]$, where k represents a band index (e.g., corresponding to a different band of frequencies than a corresponding frequency index f). Fingerprint matching device 220 may separate the frequency domain audio sample into M bands, such that k=1, 2, ..., M. The value of M may be configurable, in some implementations. Additionally, or alternatively, the bands may span a logarithmic frequency scale.

In some implementations, fingerprint matching device 220 may calculate $S_{band}[k,n]$ from $S_{bin}[f,n]$ as follows:

$$S_{band}[k,n] = \frac{1}{high[k] - low[k]} \times \sum_{f=low[k]}^{high[k]-1} |S_{bin}[f,n]|^2$$

In the above expression, high[k] may represent an upper boundary of band k, low[k] may represent a lower boundary of band k, and the value of high[k]–low[k] may increase as the value of k increases. In other words, bands that include higher frequency values may have a larger bandwidth.

As further shown in FIG. 4, process 400 may include smoothing the banded signals and stabilizing peak values included in the banded signals, to form smoothed signals (block 450). For example, fingerprint matching device 220 may smooth a banded signal (e.g., using a low-pass filter) by applying a recursive algorithm where a value of a banded signal at a particular time step is based on a value of the banded signal at a preceding time step. For example, fingerprint matching device 220 may use a single pole recursive filter that smoothes banded signals to form filtered signals. A filtered signal may be represented as $S_{lpf}[k,n]$. In some implementations, fingerprint matching device 220 may calculate $S_{lpf}[k,n]$ from $S_{band}[k,n]$ as follows:

$$S_{lpf}[k,n] = \alpha \times S_{band}[k,n] + (1-\alpha) \times S_{lpf}[k,n-1]$$

In the above expression, α may represent a configurable smoothing factor.

In some implementations, fingerprint matching device 220 may stabilize peak values, included in the banded signals, to form smoothed signals (e.g., by reducing noise and/or oscillations near the peak values). A smoothed signal may be represented as $S_{sm}[k,n]$. Fingerprint matching device 220 may generate a smoothed signal based on a filtered signal and/or a configurable decay factor β (e.g., β<1). For example, fingerprint matching device 220 may compare a filtered signal, for a particular band index and a current time step, to a product of the decay factor and a previous smoothed signal, associated with the particular band index and a previous time step. If the value of the filtered signal is greater than or equal to the product, then fingerprint matching device 220 may set a value of a current smoothed signal, for the particular band index and the current time step, equal to the value of the filtered signal. Otherwise, if the value of the filtered signal is less than the product, then fingerprint matching device 220 may set a value of a current smoothed signal, for the particular band index and the current time step, equal to the product. In this way, fingerprint matching device 220 may reduce noise near the peak values.

In other words, fingerprint matching device 220 may determine $S_{sm}[k,n]$ from $S_{lpf}[k,n]$ as follows:

if $(S_{lpf}[k,n] \geq S_{sm}[k,n-1] \times \beta)$:

then $S_{sm}[k,n] = S_{lpf}[k,n]$ else $S_{sm}[k,n] = S_{sm}[k,n-1] \times \beta$ As further shown in FIG. 4, process 400 may include identifying peak values in the smoothed signals (block 460). For example, fingerprint matching device 220 may identify peak values in the smoothed signals by identifying local maxima in the smoothed signals. A local maxima may refer to a maximum value within a frequency band window centered around band k, and within a time window centered around time n. A peak value associated with a particular band k and time n may be represented as Peak[k,n], and may be calculated as follows:

$$\text{Peak}[k, n] = \max_{\substack{max(1,k-H) \leq k \leq min(M,k+H) \\ max(1,n-W) \leq n \leq min(N,n+W)}} S_{sm}[k, n]$$

In other words, Peak[k,n] may be set equal to the maximum value of $S_{sm}[k,n]$ within a frequency band window of size 2×H centered around k (e.g., from k–H to k+H) and within a time window of size 2×W centered around n (e.g., from n–W to n+W). The values of H and W may be configurable, in some implementations. In the above expression, M may represent a quantity of bands (e.g., k=1, 2, ..., M), and N may represent a quantity of time vectors (e.g., n=1, 2, ..., N). The expressions max(1, k–H) and min(M, k+H) may be used to ensure that the frequency band window does not fall outside of the range of k (e.g., from 1 to M). Similarly, the expressions max(1, n−W) and min(N, n+W) may be used to ensure that the time window does not fall outside of the range of n (e.g., from 1 to N).

As further shown in FIG. 4, process 400 may include pruning the identified peak values (block 470), and providing the pruned peak values for audio fingerprint generation (block 480). For example, fingerprint matching device 220 may prune the identified peak values by reducing a quantity of peak values (e.g., to remove closely spaced peak values). In this way, fingerprint matching device 220 may reduce an amount of data to be processed for audio fingerprint generation.

In some implementations, fingerprint matching device 220 may prune peak values by identifying a maximum value (e.g., a local maximum) within a frequency band window centered around band k, and within a time window centered around time n. A pruned peak value associated with a particular band k and time n may be represented as $Peak_{prune}[k,n]$, and may be calculated as follows:

$$Peak_{prune}[k, n] = \max_{\substack{max(1,k-H_{prune}) \leq k \leq min(M,k+H_{prune}) \\ max(1,n-W_{prune}) \leq n \leq min(N,n+W_{prune})}} Peak[k, n]$$

In other words, $Peak_{prune}[k,n]$ may be set equal to the maximum value of $Peak[k,n]$ within a frequency band window of size $2 \times H_{prune}$ centered around k (e.g., from $k-H_{prune}$ to $k+H_{prune}$) and within a time window of size $2 \times W_{prune}$ centered around n (e.g., from $n-W_{prune}$ to $n+W_{prune}$). The values of $H_{prune}$ and $W_{prune}$ may be configurable, and may be set to different values than H and W, respectively. In some implementations, $H_{prune}$ may be set to a value greater than H, and $W_{prune}$ may be set to a value less than W.

Fingerprint matching device 220 may use the pruned peak values to generate an audio fingerprint for the audio sample, as described in more detail elsewhere herein.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
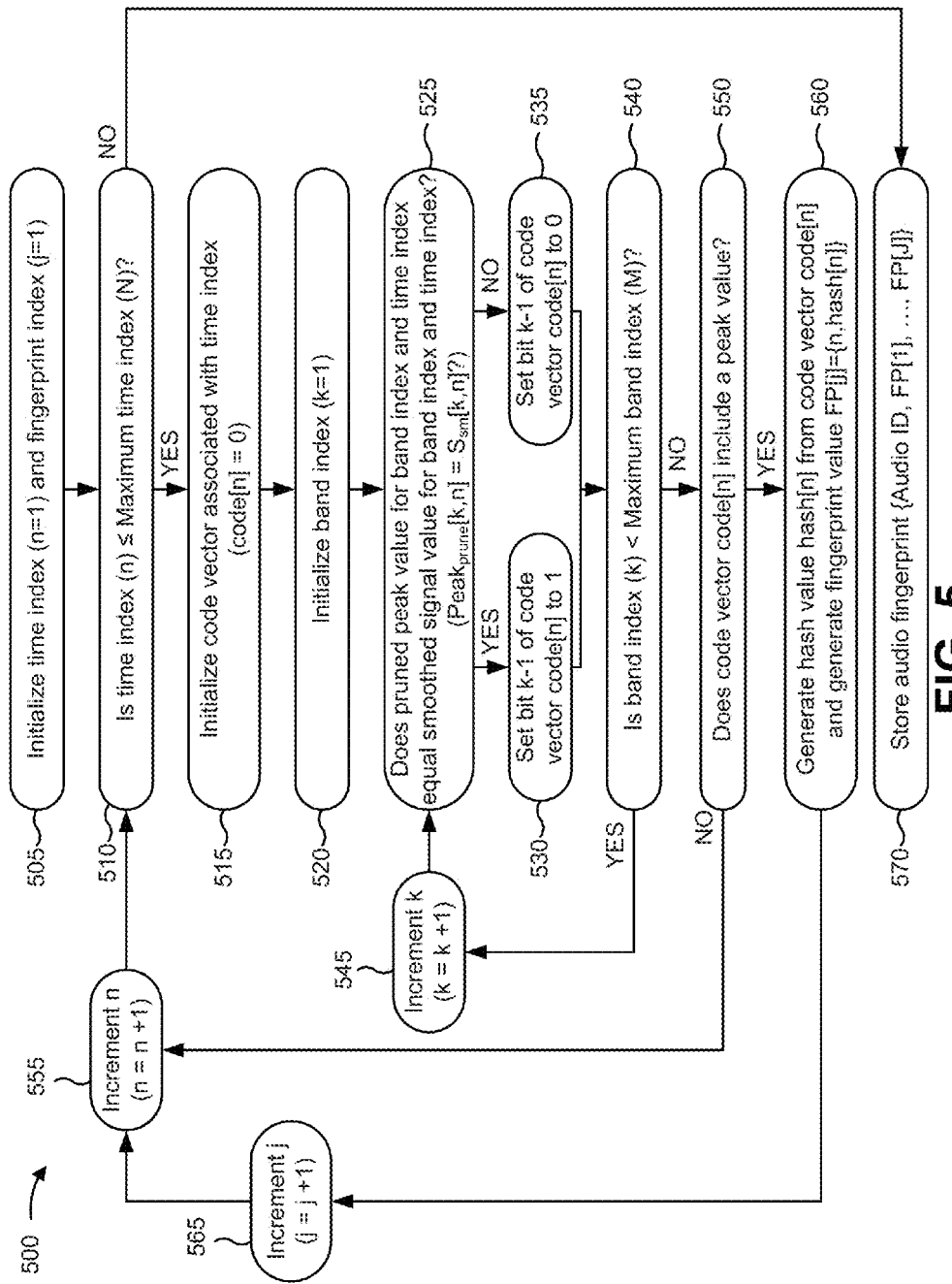
FIG. 5 is a flow chart of an example process for generating an audio fingerprint for an audio sample.

FIG. 5 is a flow chart of an example process 500 for generating an audio fingerprint for an audio sample. In some implementations, one or more process blocks of FIG. 5 may be performed by fingerprint matching device 220. In some implementations, one or more process blocks of FIG. 5 may be performed by another device or a group of devices separate from or including fingerprint matching device 220, such as content serving device 210, fingerprint storage device 230, and/or user device 240.

As shown in FIG. 5, process 500 may include initializing a time index and a fingerprint index (block 505), and determining whether the time index satisfies a time index threshold (block 510). For example, fingerprint matching device 220 may initialize a time index n by setting the time index n equal to an initial value (e.g., 1). Similarly, fingerprint matching device 220 may initialize a fingerprint index j by setting the fingerprint index j equal to an initial value (e.g., 1). Fingerprint matching device 220 may use the time index and the fingerprint index to assist in performing an audio fingerprint algorithm to generate an audio fingerprint.

Fingerprint matching device 220 may determine whether the time index n satisfies a time index threshold, such as a maximum time index value N. For example, fingerprint matching device 220 may compare n to N, may determine that the time index threshold is satisfied when n is less than or equal to N, and may determine that the time index threshold is not satisfied when n is greater N.

As further shown in FIG. 5, if the time index satisfies the time index threshold (block 510—YES), then process 500 may include initializing a code vector associated with the time index (block 515), and initializing a band index (block 520). For example, fingerprint matching device 220 may initialize a code vector code[n] associated with time index n by setting code vector code[n] equal to a null set (e.g., 0). The code vector code[n] may be used to store values that represent peak values in bands k=1 through M at time index n. For example, code[n] may include a vector of M bits.

Fingerprint matching device 220 may initialize a band index k by setting the band index k equal to an initial value (e.g., 1). Fingerprint matching device 220 may use the band index to assist in performing an audio fingerprint algorithm to generate an audio fingerprint.

As further shown in FIG. 5, process 500 may include determining whether a pruned peak value, associated with the band index and the time index, is equal to a smoothed signal value associated with the band index and the time index (block 525). For example, fingerprint matching device 220 may determine whether $Peak_{prune}[k,n]$ is equal to $S_{sm}[k,n]$ at a current time index n and band index k.

If $Peak_{prune}[k,n]$ is equal to $S_{sm}[k,n]$ (block 525—YES), then process 500 may include setting a code vector bit, corresponding to the band index, equal to a first value (block 530). For example, if $Peak_{prune}[k,n]$ is equal to $S_{sm}[k,n]$, then a signal corresponding to time index n and band index k corresponds to a peak value. In this case, fingerprint matching device 220 may indicate this peak value by setting a corresponding bit of the code vector equal to a first value. For example, fingerprint matching device 220 may set bit k−1 of code vector code[n] equal to one.

If $Peak_{prune}[k,n]$ is not equal to $S_{sm}[k,n]$ (block 525—NO), then process 500 may include setting a code vector bit, corresponding to the band index, equal to a second value (block 535). For example, if $Peak_{prune}[k,n]$ is not equal to $S_{sm}[k,n]$, then a signal corresponding to time index n and band index k does not correspond to a peak value. In this case, fingerprint matching device 220 may indicate this non-peak value by setting a corresponding bit of the code vector equal to a second value. For example, fingerprint matching device 220 may set bit k−1 of code vector code[n] equal to zero.

As further shown in FIG. 5, process 500 may include determining whether the band index satisfies a band index threshold (block 540). For example, fingerprint matching device 220 may determine whether band index k satisfies a band index threshold, such as a maximum band index value M. Fingerprint matching device 220 may compare k to M, may determine that the band index threshold is satisfied when k is less than M, and may determine that the band index threshold is not satisfied when k is greater than or equal to M.

As further shown in FIG. 5, if the band index satisfies the band index threshold (block 540—YES), then process 500 may include incrementing the band index (block 545) and returning to block 525. For example, fingerprint matching device 220 may increment the value of k (e.g., k=k+1). Fingerprint matching device 220 may return to block 525 to continue comparing pruned peak values and smoothed signal values associated with the incremented value of k until all values of k (e.g., k=1 through M), for a particular time index n, have been analyzed.

As further shown in FIG. 5, if the band index does not satisfy the band index threshold (block 540—NO), then process 500 may include determining whether the current code vector includes a peak value (block 550). For example, when the band index value does not satisfy the band index threshold, then fingerprint matching device 220 has generated a value (e.g., 0 or 1) for each bit, corresponding to each band index k, included in the code vector code[n]. In this case, fingerprint matching device 220 may determine whether code vector code[n] includes a peak value by analyzing the values of the bits of code[n]. If the bits are all equal to zero, then fingerprint matching device 220 may determine that code[n] does not include a peak value for any values of k (e.g., when code[n]=null set=0). However, if code[n] includes a bit with a value of 1, then code[n] includes a peak value.

If the current code vector does not include a peak value (block 550—NO), then process 500 may include incrementing the time index (block 555) and returning to block 510. For example, fingerprint matching device 220 may increment the value of n (e.g., n=n+1). Fingerprint matching device 220 may return to block 510 to continue to analyze whether other time index values n (e.g., each n from n=1 through N) include peak values.

If the current code vector includes a peak value (block 550—YES), then process 500 may include generating a hash value from the current code vector, and generating a fingerprint value, for a current fingerprint index, that identifies the current time index and the hash value associated with the current time index (block 560). For example, the code vector may include M bits, and fingerprint matching device 220 may apply a hashing algorithm to generate a hash value hash[n], corresponding to the current time index, from code vector code[n]. For example, the hashing algorithm may include SHA1, SHA2, MD5, etc. The hash value may include fewer bits than the code vector, thereby reducing a size of an audio fingerprint that includes the hash value rather than the code vector.

Fingerprint matching device 220 may generate a fingerprint value FP[j], where FP[j] includes a pair of corresponding values {n, hash[n]}. When there is no peak value associated with time index n (e.g., when code[n]=null set=0), fingerprint matching device 220 may not store a fingerprint value for time index n.

As further shown in FIG. 5, process 500 may include incrementing the fingerprint index (block 565), incrementing the time index (block 555), and returning to block 510. For example, fingerprint matching device 220 may increment the value of j (e.g., j=j+1), may increment the value of n (e.g., n=n+1), and may return to block 510 to continue to analyze for peak values and to generate fingerprint values for additional fingerprint index values until all time index values (e.g., n=1 through N) have been processed.

If the time index does not satisfy the time index threshold (block 510—NO), then process 500 may include storing an audio fingerprint that includes an audio identifier and one or more fingerprint values (block 570). For example, when fingerprint matching device 220 has finished analyzing peak values for all time index values n=1 through N, then fingerprint matching device 220 may generate an audio fingerprint. In some implementations, the audio fingerprint may include an audio identifier (e.g., an advertisement identifier, a song identifier, etc.). Additionally, or alternatively, the audio fingerprint may include each generated fingerprint value FP[j] for j=1 to J. The value of J may correspond to the quantity of time index values n associated with a peak value.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

Figure 6:
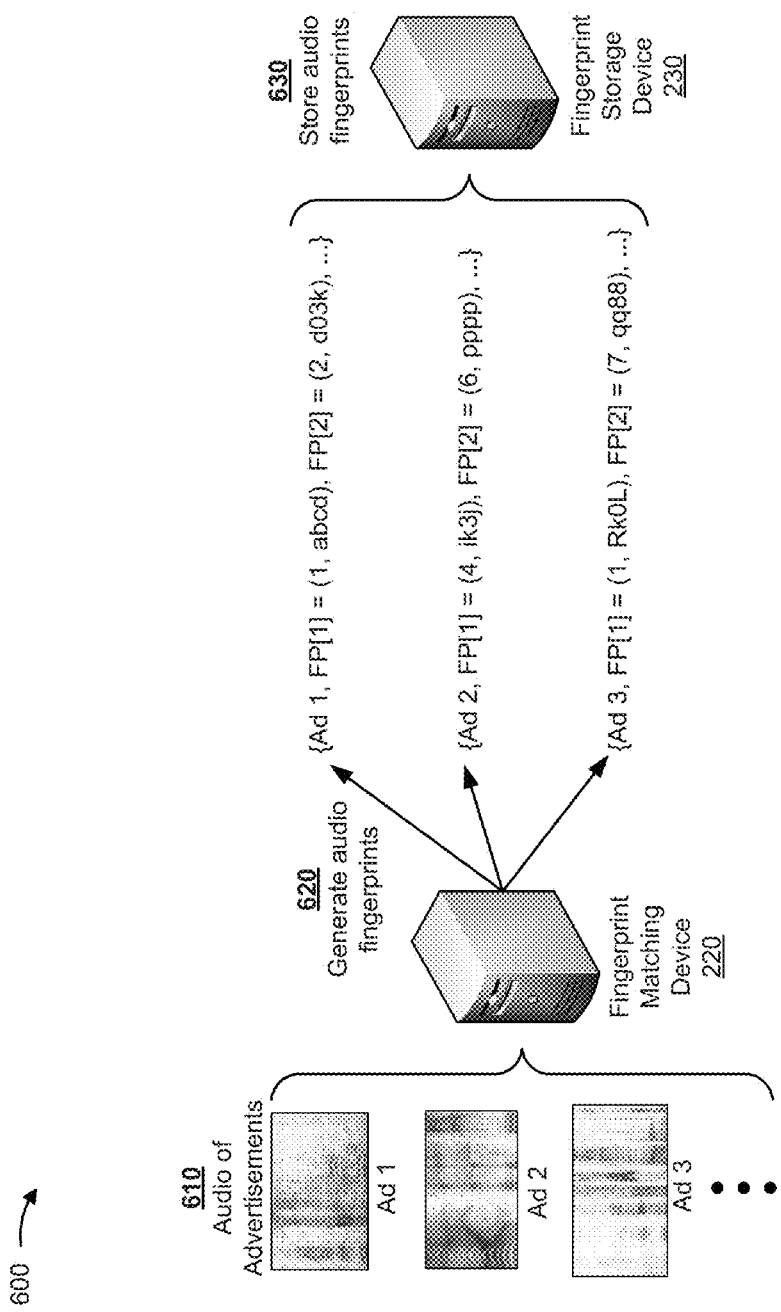
FIG. 6 is a diagram of an example implementation relating to the example processes shown in FIGS. 4 and 5.

FIG. 6 is a diagram of an example implementation 600 relating to example processes 400 and 500 shown in FIGS. 4 and 5. FIG. 6 shows an example of generating audio fingerprints for multiple audio samples, and storing the audio fingerprints to be used to identify a later-received audio stream (e.g., and/or an audio sample included in the audio stream).

As shown in FIG. 6, and by reference number 610, assume that fingerprint matching device 220 receives audio samples for multiple advertisements. As shown by reference number 620, assume that fingerprint matching device 220 performs the processes described herein in connection with FIGS. 4 and 5 to generate audio fingerprints for the audio samples. For example, assume that a first audio fingerprint, generated from the audio sample for Ad 1, includes an audio identifier, shown as "Ad 1," a first fingerprint value FP[1] for time index 1 and an associated hash value "abcd," a second fingerprint value FP[2] for time index 2 and an associated hash value "d03k," etc. As further shown, assume that a second audio fingerprint, generated from the audio sample for Ad 2, includes an audio identifier, shown as "Ad 2," a first fingerprint value FP[1] for time index 4 and an associated hash value "ik3j," a second fingerprint value FP[2] for time index 6 and an associated hash value "pppp," etc. As further shown, assume that a third audio fingerprint, generated from the audio sample for Ad 3, includes an audio identifier, shown as "Ad 3," a first fingerprint value FP[1] for time index 1 and an associated hash value "Rk0L," a second fingerprint value FP[2] for time index 7 and an associated hash value "qq88," etc. As shown by reference number 630, assume that fingerprint matching device 220 provides the audio fingerprints to fingerprint storage device 230 for storage.

As indicated above, FIG. 6 is provided merely as an example. Other examples are possible and may differ from what was described with regard to FIG. 6.

Figure 7:
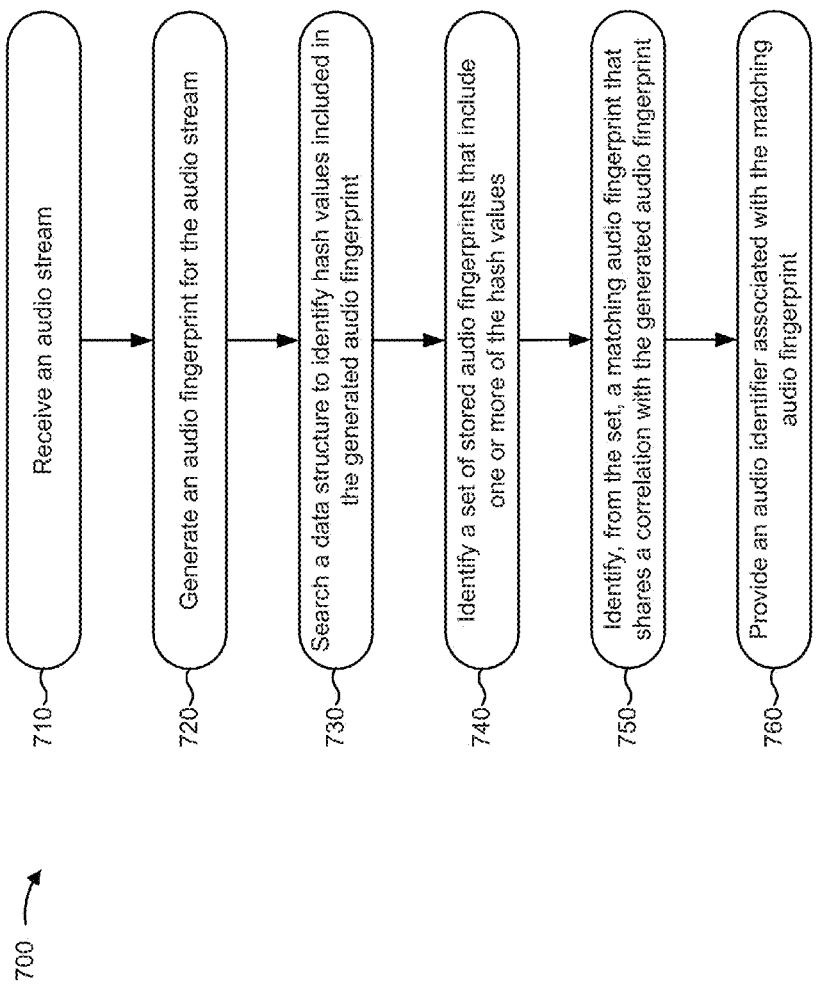
FIG. 7 is a flow chart of an example process for identifying an audio stream using an audio fingerprint.

FIG. 7 is a flow chart of an example process 700 for identifying an audio stream using an audio fingerprint. In some implementations, one or more process blocks of FIG. 7 may be performed by fingerprint matching device 220. In some implementations, one or more process blocks of FIG. 7 may be performed by another device or a group of devices separate from or including fingerprint matching device 220, such as content serving device 210, fingerprint storage device 230, and/or user device 240.

As shown in FIG. 7, process 700 may include receiving an audio stream (block 710), and generating an audio fingerprint for the audio stream (block 720). For example, fingerprint matching device 220 may receive an audio stream from content server 210. Fingerprint matching device 220 may generate an audio fingerprint for the audio stream as described herein in connection with FIGS. 4 and 5. However, in some implementations, the generated audio fingerprint may not include an audio identifier. In other words, fingerprint matching device 220 may include an audio identifier in audio fingerprints to be stored in the audio fingerprint database and used for identification purposes, and may not include an audio identifier in audio fingerprints for incoming audio streams to be identified using audio fingerprints stored in the database. Additionally, or alternatively, the audio fingerprints may include hash values.

As further shown in FIG. 7, process 700 may include searching a data structure to identify hash values included in the generated audio fingerprint (block 730), and identifying a set of stored audio fingerprints that include one or more of the hash values (block 740). For example, fingerprint matching device 220 may search a data structure (e.g., stored by one or more fingerprint storage devices 230) to identify hash values included in the generated audio fingerprint. If a stored audio fingerprint includes a hash value that matches one of the hash values included in the generated audio fingerprint, fingerprint matching device 220 may include the stored audio fingerprint in a set of stored audio fingerprints.

As further shown in FIG. 7, process 700 may include identifying, from the set, a matching audio fingerprint that shares a correlation with the generated audio fingerprint (block 750). For example, once fingerprint matching device 220 has generated the set of stored audio fingerprints that include a matching hash value (e.g., that matches a hash value included in the generated audio fingerprint), fingerprint matching device 220 may identify a particular stored audio fingerprint, included in the set, that shares a correlation with the generated audio fingerprint (e.g., a stored audio fingerprint that is a strongest match with the generated audio fingerprint, based on a quantity of matches, a strength of a correlation, etc.).

If none of the stored audio fingerprints in the set share a correlation (e.g., based on a configurable matching threshold) with the generated audio fingerprint, then fingerprint matching device 220 may determine that there is no match. Fingerprint matching device 220 may perform an action based on determining that there is no match, such as by providing the audio stream to another device (e.g., user device 240) without instructions that may otherwise be provided if there were a match.

In some implementations, fingerprint matching device 220 may generate a histogram to determine a correlation between a stored audio fingerprint and the generated audio fingerprint. For each matching hash value included in the generated audio fingerprint and the stored audio fingerprint, fingerprint matching device 220 may calculate:

$$\Delta n = n_{matching} - n_{generated}$$

In the above expression, $n_{matching}$ may represent a time index value n paired with a matching hash value included in the stored audio fingerprint, and $n_{generated}$ may represent a time index value n paired with a matching hash value included in the generated audio fingerprint. For a particular stored audio fingerprint, fingerprint matching device 220 may plot the $\Delta n$ values (e.g., for each pair of matching hash values) over the time indices in a histogram, and may determine whether a matching threshold is satisfied. In other words, fingerprint matching device 220 may determine whether a quantity of $\Delta n$ values, for a particular time index, satisfies a matching threshold.

In some implementations, fingerprint matching device 220 may calculate a ratio of the quantity of $\Delta n$ values, for a particular time index, to a total quantity of matching hash values between the particular stored audio fingerprint and the generated audio fingerprint, and may determine whether the ratio satisfies the matching threshold (e.g., which may be a configurable value set to, for example, 0.5, 0.6, etc.).

If a particular stored audio fingerprint satisfies the matching threshold, then fingerprint matching device 220 may identify the particular stored audio fingerprint as a matching audio fingerprint. If multiple stored audio fingerprints satisfy the matching threshold, then fingerprint matching device 220 may identify the stored audio fingerprint with a highest match ratio (e.g., a highest ratio of $\Delta n$ values, for a particular time index, to matching hash values) as the matching audio fingerprint.

As further shown in FIG. 7, process 700 may include providing an audio identifier associated with the matching audio fingerprint (block 760). For example, fingerprint matching device 220 may identify an audio identifier associated with the matching audio fingerprint (e.g., an audio identifier included in the matching audio fingerprint), and may provide the audio identifier. In some implementations, the audio identifier may be associated with one or more characteristics that identify an action to be performed by fingerprint matching device 220 in association with the audio stream. For example, if the audio stream corresponds to a particular advertisement (e.g., as indicated by the audio identifier), fingerprint matching device 220 may substitute a different advertisement into a content stream being provided to user device 240, may provide an instruction to prevent the particular advertisement from being skipped or fast-forwarded by user device 240, may provide the audio identifier to user device 240 for display, etc.

While described herein with respect to advertisements, fingerprint matching device 220 may perform processes described herein for other types of audio content. For example, the audio stream may include a song clip, and fingerprint matching device 220 may determine a song identifier based on the song clip, and may provide the song identifier to user device 240 (e.g., for display). In this way, fingerprint matching device 220 may use the audio fingerprint generation technique described herein to identify any type of audio.

Although FIG. 7 shows example blocks of process 700, in some implementations, process 700 may include additional blocks, fewer blocks, different blocks, or differently arranged blocks than those depicted in FIG. 7. Additionally, or alternatively, two or more of the blocks of process 700 may be performed in parallel.

Figure 8A:
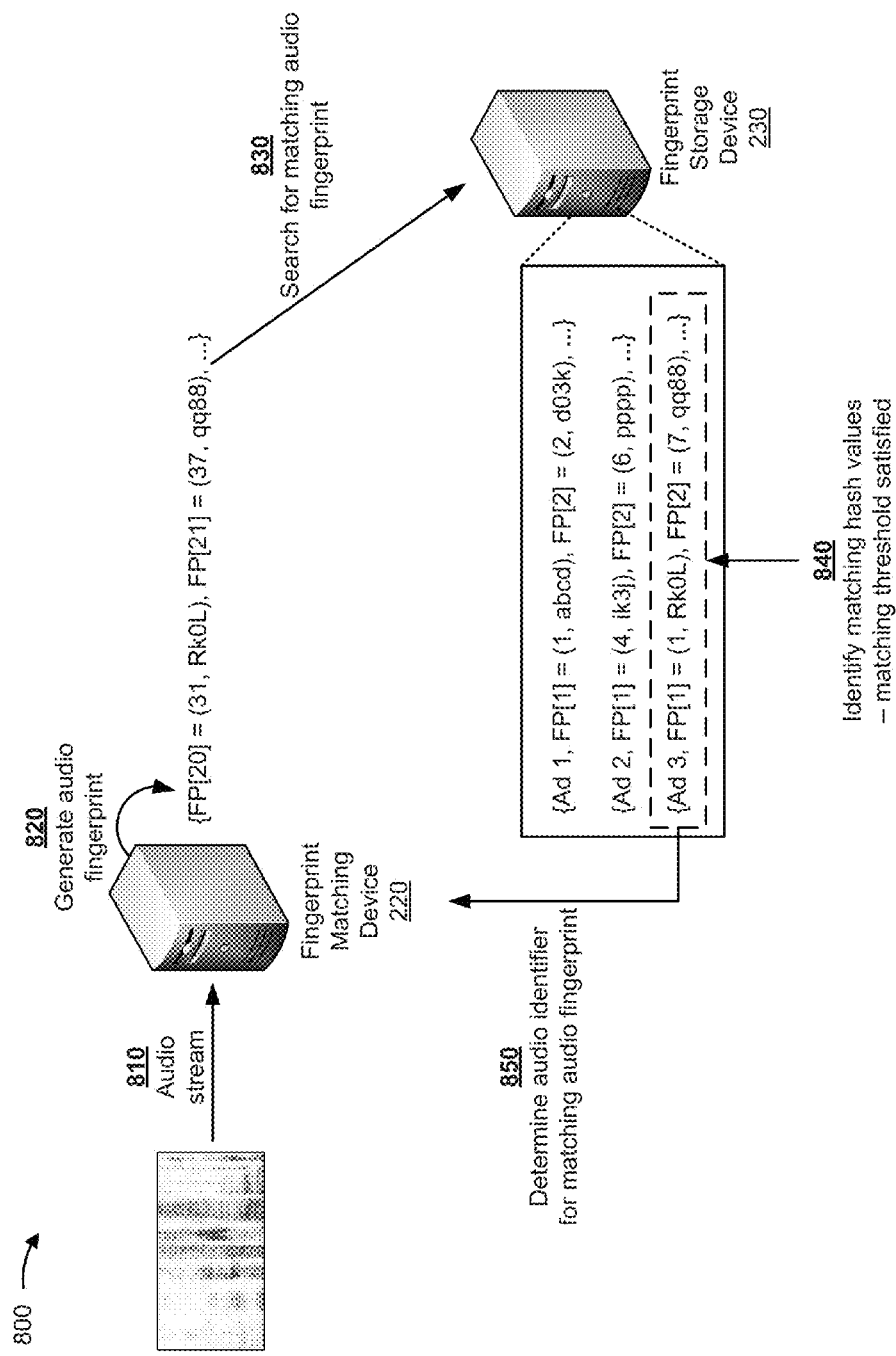
FIGS. 8A and 8B are diagrams of an example implementation relating to the example process shown in FIG. 7.
Figure 8B:
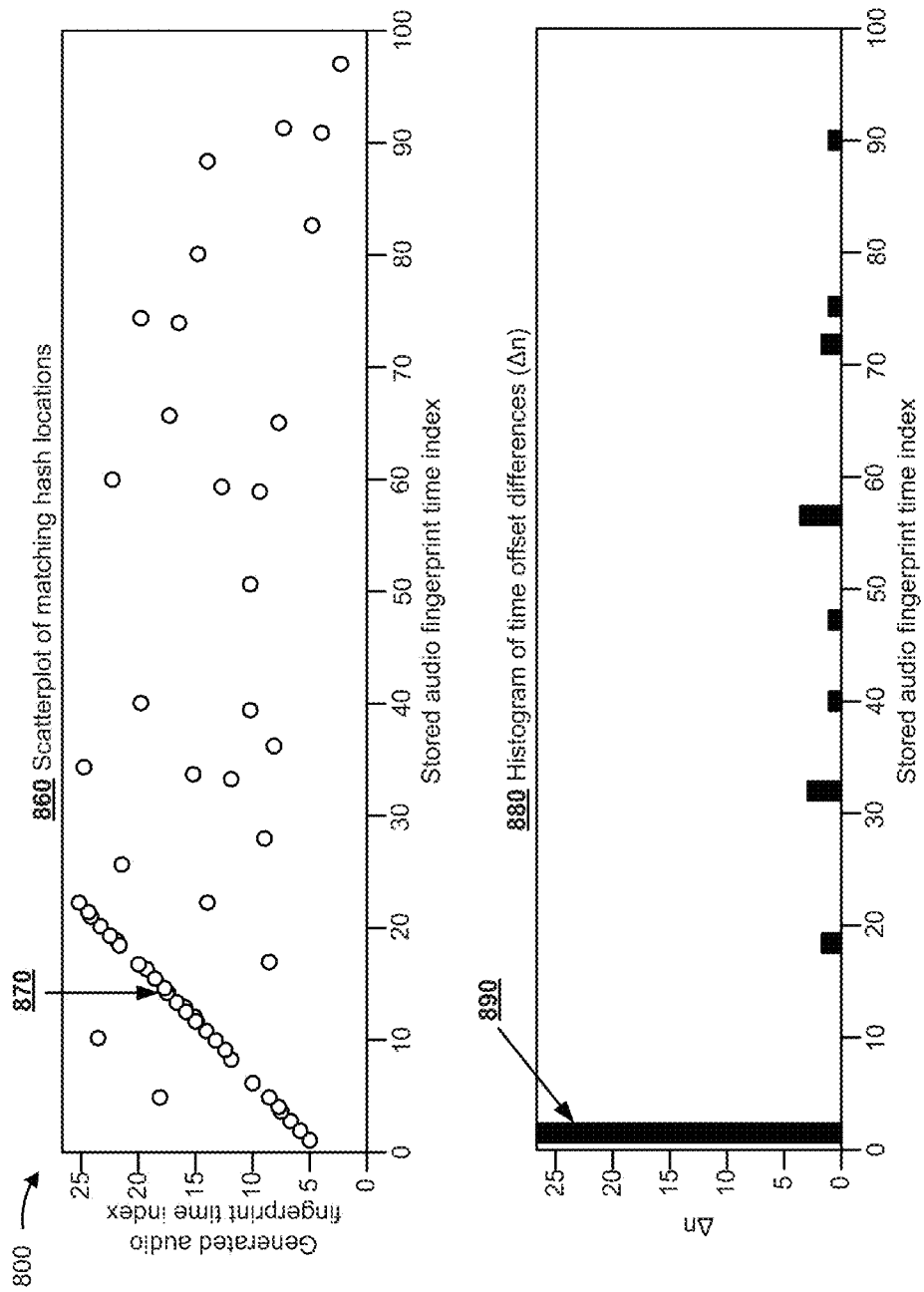

FIGS. 8A and 8B are diagrams of an example implementation 800 relating to the example process shown in FIG. 7. FIGS. 8A and 8B show an example of identifying an audio stream using an audio fingerprint.

As shown in FIG. 8A, and by reference number 810, assume that fingerprint matching device 220 receives an audio stream (e.g., from content serving device 210). As shown by reference number 820, assume that fingerprint matching device 220 generates an audio fingerprint for the received audio stream. As shown, the generated audio fingerprint may not include an audio identifier. As shown by reference number 830, fingerprint matching device 220 may search a data structure (e.g., stored by fingerprint storage device 230) to identify a matching audio fingerprint.

As shown by reference number 840, fingerprint matching device 220 may identify matching hash values included in an audio fingerprint for an audio sample identified as "Ad 3." The matching hash values are shown as "RkOL" and "qq88." As shown, then time index values in the generated audio fingerprint, shown as 31 and 37, do not match the corresponding time index values in the stored audio fingerprint, shown as 1 and 7. This is because fingerprint matching device 220 analyzes the audio stream as the audio stream is received, and does not know where a new audio sample (e.g., segment), included in the audio stream, begins and ends. However, the difference between the time index values (e.g., $\Delta n$) is the same for these matching hash values (e.g., 37−31=7−1=6). Assume that fingerprint matching device 220 calculates a ratio of the quantity of matching time offset values to the total quantity of matching hash values, and determines that the ratio satisfies a matching threshold, as described in more detail in connection with FIG. 8B. As shown by reference number 850, assume that fingerprint matching device 220 determines an audio identifier for the matching audio fingerprint.

As shown in FIG. 8B, fingerprint matching device 220 may generate a scatterplot 860 of matching hash locations (e.g., a time index in the generated audio fingerprint vs. a corresponding time index in the stored audio fingerprint for a matching hash value). As shown by reference number 870, a correlation (e.g., a diagonal in the scatterplot) may indicate that the stored audio fingerprint is a matching audio fingerprint.

As further shown, fingerprint matching device 220 may generate a histogram 880 of time offset differences for matching hash locations with respect to a particular time index (e.g., in the stored audio fingerprint). As shown by reference number 890, a high quantity of time offset differences (e.g., that satisfies a matching threshold) at a particular time index value may indicate that the stored audio fingerprint is a matching audio fingerprint.

As indicated above, FIGS. 8A and 8B are provided merely as an example. Other examples are possible and may differ from what was described with regard to FIGS. 8A and 8B.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items, and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
   one or more processors to:
   receive an audio sample;
   separate the audio sample into a plurality of sub-band signals in a plurality of frequency bands;
   modify an upper boundary and a lower boundary of at least one of the plurality of frequency bands to form a plurality of modified frequency bands;
   modify the plurality of sub-band signals to form a plurality of banded signals associated with the plurality of modified frequency bands;
   smooth the plurality of banded signals to form a plurality of smoothed signal values;
   identify a plurality of peak values included in the plurality of smoothed signal values; and
   generate an audio fingerprint for the audio sample based on the plurality of smoothed signal values and the plurality of peak values.

2. The device of claim 1, where the one or more processors, when modifying the upper boundary and the lower boundary, are further to:
   convert a linear frequency scale of a frequency band, of the plurality of frequency bands, to a logarithmic frequency scale to form a modified frequency band, of the plurality of modified frequency bands.

3. The device of claim 1, where the one or more processors are further to:
   compare a peak value, of the plurality of peak values, that corresponds to a band index and a time index, to a smoothed signal value, of the plurality of smoothed signal values, that corresponds to the band index and the time index,
   the band index identifying a modified frequency band of the plurality of modified frequency bands,
   the time index identifying a time associated with the audio sample; and
   where the one or more processors, when generating the audio fingerprint, are further to:
   generate the audio fingerprint based on comparing the peak value to the smoothed signal value.

4. The device of claim 3, where the one or more processors, when generating the audio fingerprint, are further to:
   generate a code vector, corresponding to the time index, to be included in the audio fingerprint;
   insert a first value or a second value into the code vector, at a position corresponding to the band index, based on comparing the peak value and the smoothed signal value,
   the first value being inserted when the peak value and the smoothed signal value are a same value,
   the second value being inserted when the peak value and the smoothed signal value are a different value;

generate a hash value, corresponding to the time index, based on the code vector; and include the hash value in the audio fingerprint.

5. The device of claim 1, where the one or more processors are further to:

select a subset of the plurality of peak values to form a plurality of pruned peak values;

compare the plurality of pruned peak values, corresponding to different pairs of band indexes and time indexes, to respective smoothed signal values, of the plurality of smoothed signal values, corresponding to the different pairs of band indexes and time indexes, the band indexes identifying modified frequency bands of the plurality of modified frequency bands, the time indexes identifying times associated with the audio sample; and where the one or more processors, when generating the audio fingerprint, are further to:

generate the audio fingerprint based on comparing the plurality of pruned peak values to the smoothed signal values.

6. The device of claim 1, where the one or more processors are further to:

for each of the plurality of modified frequency bands, compare a peak value, of the plurality of peak values, that corresponds to a band index and a time index, to a smoothed signal value, of the plurality of smoothed signal values, that corresponds to the band index and the time index, the band index corresponding to a modified frequency band of the plurality of modified frequency bands, the time index corresponding to a time associated with the audio sample; and generate a code vector based on comparing the peak value to the smoothed signal value for each of the plurality of modified frequency bands, the code vector having a length that corresponds to a quantity of modified frequency bands included in the plurality of modified frequency bands.

7. The device of claim 1, where the one or more processors are further to:

cause a search of a data structure to be performed using the generated audio fingerprint;

identify a matching audio fingerprint, stored in the data structure, based on the search of the data structure; and provide an audio identifier that identifies the matching audio fingerprint.

8. A computer-readable medium storing instructions, the instructions comprising:

one or more instructions that, when executed by one or more processors, cause the one or more processors to:

receive an audio sample;

separate the audio sample into a plurality of sub-band signals in a plurality of frequency bands;

modify an upper boundary and a lower boundary of at least one of the plurality of frequency bands to form a plurality of modified frequency bands;

modify the plurality of sub-band signals to form a plurality of banded signals associated with the plurality of modified frequency bands;

smooth the plurality of banded signals to form a plurality of smoothed signal values;

identify a plurality of peak values included in the plurality of smoothed signal values; and generate an audio fingerprint for the audio sample based on the plurality of smoothed signal values and the plurality of peak values.

9. The computer-readable medium of claim 8, where the one or more instructions, that cause the one or more processors to modify the upper boundary and the lower boundary, further cause the one or more processors to:

convert a linear frequency scale of a frequency band, of the plurality of frequency bands, to a logarithmic frequency scale to form a modified frequency band, of the plurality of modified frequency bands.

10. The computer-readable medium of claim 8, where the one or more instructions, when executed by the one or more processors, further cause the one or more processors to:

compare a peak value, of the plurality of peak values, that corresponds to a band index and a time index, to a smoothed signal value, of the plurality of smoothed signal values, that corresponds to the band index and the time index, the band index identifying a modified frequency band of the plurality of modified frequency bands, the time index identifying a time associated with the audio sample; and where the one or more instructions, that cause the one or more processors to generate the audio fingerprint, further cause the one or more processors to:

generate the audio fingerprint based on comparing the peak value to the smoothed signal value.

11. The computer-readable medium of claim 10, where the one or more instructions, that cause the one or more processors to generate the audio fingerprint, further cause the one or more processors to:

generate a code vector, corresponding to the time index, to be included in the audio fingerprint;

insert a first value or a second value into the code vector, at a position corresponding to the band index, based on comparing the peak value and the smoothed signal value, the first value being inserted when the peak value and the smoothed signal value are a same value, the second value being inserted when the peak value and the smoothed signal value are a different value;

generate a hash value, corresponding to the time index, based on the code vector; and include the hash value in the audio fingerprint.

12. The computer-readable medium of claim 8, where the one or more instructions, when executed by the one or more processors, further cause the one or more processors to:

select a subset of the plurality of peak values to form a plurality of pruned peak values;

compare the plurality of pruned peak values, corresponding to different pairs of band indexes and time indexes, to respective smoothed signal values, of the plurality of smoothed signal values, corresponding to the different pairs of band indexes and time indexes, the band indexes identifying modified frequency bands of the plurality of modified frequency bands, the time indexes identifying times associated with the audio sample; and where the one or more instructions, that cause the one or more processors to generate the audio fingerprint, further cause the one or more processors to:

generate the audio fingerprint based on comparing the plurality of pruned peak values to the smoothed signal values.

13. The computer-readable medium of claim 8, where the one or more instructions, when executed by the one or more processors, further cause the one or more processors to:

for each of the plurality of modified frequency bands, compare a peak value, of the plurality of peak values, that corresponds to a band index and a time index, to a smoothed signal value, of the plurality of smoothed signal values, that corresponds to the band index and the time index,
    the band index corresponding to a modified frequency band of the plurality of modified frequency bands,
    the time index corresponding to a time associated with the audio sample; and
generate a code vector based on comparing the peak value to the smoothed signal value for each of the plurality of modified frequency bands,
    the code vector having a length that corresponds to a quantity of modified frequency bands included in the plurality of modified frequency bands.

14. The computer-readable medium of claim 8, where the one or more instructions, when executed by the one or more processors, further cause the one or more processors to:
cause a search of a data structure to be performed using the generated audio fingerprint;
identify a matching audio fingerprint, stored in the data structure, based on the search of the data structure; and
provide an audio identifier that identifies the matching audio fingerprint.

15. A method, comprising:
receiving, by a device, an audio sample;
separating, by the device, the audio sample into a plurality of sub-band signals in a plurality of frequency bands;
modifying, by the device, an upper boundary and a lower boundary of at least one of the plurality of frequency bands to form a plurality of modified frequency bands;
modifying, by the device, the plurality of sub-band signals to form a plurality of banded signals associated with the plurality of modified frequency bands;
smoothing, by the device, the plurality of banded signals to form a plurality of smoothed signal values;
identifying, by the device, a plurality of peak values included in the plurality of smoothed signal values;
generating, by the device, an audio fingerprint for the audio sample based on the plurality of smoothed signal values and the plurality of peak values;
causing, by the device, a search of a data structure to be performed using the generated audio fingerprint;
identifying, by the device, a matching audio fingerprint, stored in the data structure, based on the search of the data structure; and
providing, by the device, an audio identifier associated with the matching audio fingerprint.

16. The method of claim 15, where modifying the upper boundary and the lower boundary further comprises:
converting a linear frequency scale of a frequency band, of the plurality of frequency bands, to a logarithmic frequency scale to form a modified frequency band, of the plurality of modified frequency bands.

17. The method of claim 15, further comprising:
comparing a peak value, of the plurality of peak values, that corresponds to a band index and a time index, to a smoothed signal value, of the plurality of smoothed signal values, that corresponds to the band index and the time index,
    the band index identifying a modified frequency band of the plurality of modified frequency bands,
    the time index identifying a time associated with the audio sample; and
where generating the audio fingerprint further comprises:
    generating the audio fingerprint based on comparing the peak value to the smoothed signal value.

18. The method of claim 17, where generating the audio fingerprint further comprises:
generating a code vector, corresponding to the time index, to be included in the audio fingerprint;
inserting a first value or a second value into the code vector, at a position corresponding to the band index, based on comparing the peak value and the smoothed signal value,
    the first value being inserted when the peak value and the smoothed signal value are a same value,
    the second value being inserted when the peak value and the smoothed signal value are a different value;
generating a hash value, corresponding to the time index, based on the code vector; and
including the hash value in the audio fingerprint.

19. The method of claim 15, further comprising:
selecting a subset of the plurality of peak values to form a plurality of pruned peak values;
comparing the plurality of pruned peak values, corresponding to different pairs of band indexes and time indexes, to respective smoothed signal values, of the plurality of smoothed signal values, corresponding to the different pairs of band indexes and time indexes,
    the band indexes identifying modified frequency bands of the plurality of modified frequency bands,
    the time indexes identifying times associated with the audio sample; and
where generating the audio fingerprint further comprises:
    generating the audio fingerprint based on comparing the plurality of pruned peak values to the smoothed signal values.

20. The method of claim 15, further comprising:
for each of the plurality of modified frequency bands, comparing a peak value, of the plurality of peak values, that corresponds to a band index and a time index, to a smoothed signal value, of the plurality of smoothed signal values, that corresponds to the band index and the time index,
    the band index corresponding to a modified frequency band of the plurality of modified frequency bands,
    the time index corresponding to a time associated with the audio sample; and
generating a code vector based on comparing the peak value to the smoothed signal value for each of the plurality of modified frequency bands,
    the code vector having a length that corresponds to a quantity of modified frequency bands included in the plurality of modified frequency bands.

\* \* \* \* \*